(12) United States Patent
Yuodelis

(10) Patent No.: US 10,047,254 B2
(45) Date of Patent: Aug. 14, 2018

(54) CURABLE COMPOSITE MANUFACTURING ADHESIVE

(71) Applicant: Bondek Corporation, Bellevue, WA (US)

(72) Inventor: Robert R. Yuodelis, Bellevue, WA (US)

(73) Assignee: Bondek Corporation, Bellevue, WA (US)

( * ) Notice: Subject to any disclaimer, the term of this patent is extended or adjusted under 35 U.S.C. 154(b) by 845 days.

(21) Appl. No.: 14/493,889

(22) Filed: Sep. 23, 2014

(65) Prior Publication Data

US 2015/0083321 A1    Mar. 26, 2015

Related U.S. Application Data

(60) Provisional application No. 61/881,190, filed on Sep. 23, 2013.

(51) Int. Cl.

| C09J 179/04 | (2006.01) |
|---|---|
| C08G 59/00 | (2006.01) |
| C09J 133/10 | (2006.01) |
| C08K 5/07 | (2006.01) |
| C08G 12/42 | (2006.01) |
| C09J 161/28 | (2006.01) |
| C09J 161/32 | (2006.01) |
| B29C 70/54 | (2006.01) |
| B29C 70/44 | (2006.01) |
| C09J 171/03 | (2006.01) |
| C08G 59/50 | (2006.01) |

(52) U.S. Cl.
CPC .......... *C09J 133/10* (2013.01); *B29C 70/443* (2013.01); *B29C 70/543* (2013.01); *C08G 12/427* (2013.01); *C08K 5/07* (2013.01); *C09J 161/28* (2013.01); *C09J 161/32* (2013.01); *C09J 171/03* (2013.01); *C08G 59/5086* (2013.01); *C09J 179/04* (2013.01); *C09J 2461/00* (2013.01)

(58) Field of Classification Search
None
See application file for complete search history.

(56) References Cited

U.S. PATENT DOCUMENTS

| 3,945,961 A | 3/1976 | Blank |
|---|---|---|
| 4,861,833 A | 8/1989 | Chasser et al. |
| 5,753,727 A | 5/1998 | Sato et al. |
| 6,376,070 B1 | 4/2002 | Nakasuga et al. |
| 2006/0276591 A1 | 12/2006 | Husemann et al. |
| 2008/0251202 A1 | 10/2008 | Eagle et al. |

(Continued)

FOREIGN PATENT DOCUMENTS

WO    WO-2012071028 A1 *  5/2012  .............. C08L 63/00

OTHER PUBLICATIONS

Bugnicourt, E. et al., "Effect of sub-micron silica fillers on the mechanical performances of epoxy-based composites". Polymer 2007, 48 1596-1605.*

(Continued)

*Primary Examiner* — Richard A Huhn
(74) *Attorney, Agent, or Firm* — Hamre, Schumann, Mueller & Larson, P.C.

(57) ABSTRACT

A curable adhesive that is modified to allow spray application and polymerization seamlessly during the process of epoxy resin vacuum infusion.

5 Claims, 6 Drawing Sheets

(56) References Cited

U.S. PATENT DOCUMENTS

2012/0299216 A1    11/2012  Carnahan et al.

OTHER PUBLICATIONS

Zhang, X. et al., "Preparation and Properties of Epoxy/Phenol Formaldehyde Novolac/Hexakis(methoxymethyl)melamine Hybrid Resins from In Situ Polymerization". Journal of Applied Polymer Science 2008, 110, 4084-4092.*
Borak, et al., "Methyl Methacrylate and Respiratory Sensitization: A Critical Review", Critical Reviews in Toxicology, 2011, vol. 41, No. 3, pp. 230-268.
"Occupational Allergic Airbone Contact Dermatitis and Delayed Bronchial Asthma From Epoxy Resin Revealed by Bronchial Provocation Test", European Journal of Dermatology, vol. 10, Issue 6, Sep. 2000, 8 pgs.
Kanerva, et al., "Occupational Contact Urticaria from Diglycidyl Ether of Bisphenol A Epoxy Resin", Allergy 2002, vol. 57, pp. 1205-1207.
Jolanki, "Occupational Skin Diseases from Epoxy Compounds", Acta Dermato-Venereologica, Supplementum 159, 1991, 77 pgs.
Zhang, et al., "Preparation and Properties of Epoxy/Phenol Formaldehyde Novolac/Hexakis(methoxymethyl)melamine Hybrid Resins from In Situ Polymerization", Journal of Applied Polymer Science, vol. 110, Published 2008, pp. 4084-4092.

\* cited by examiner

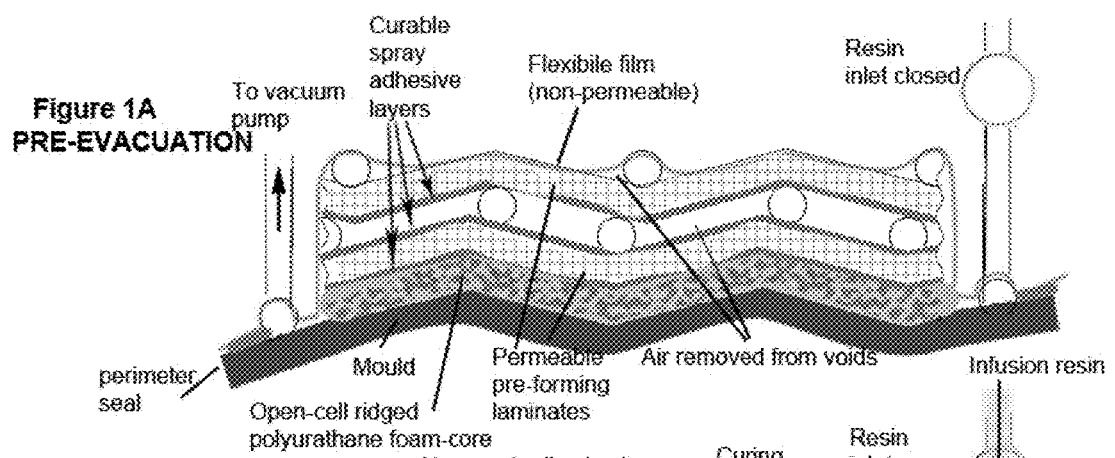
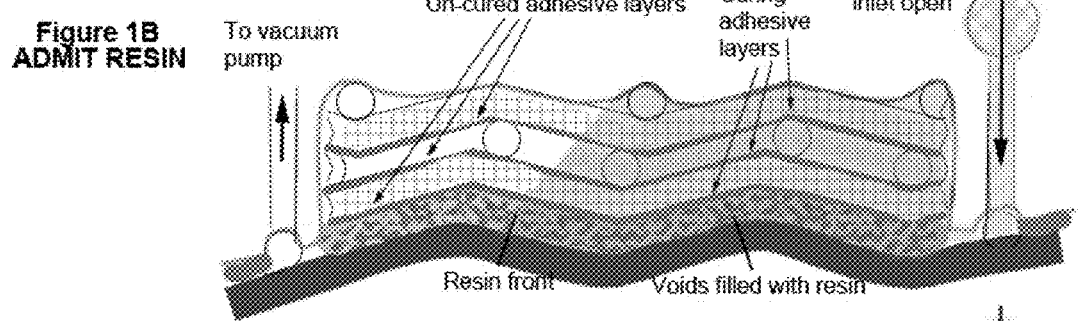
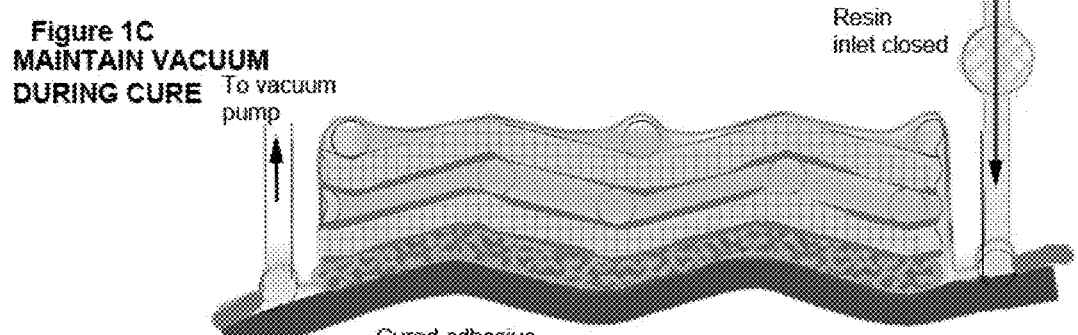
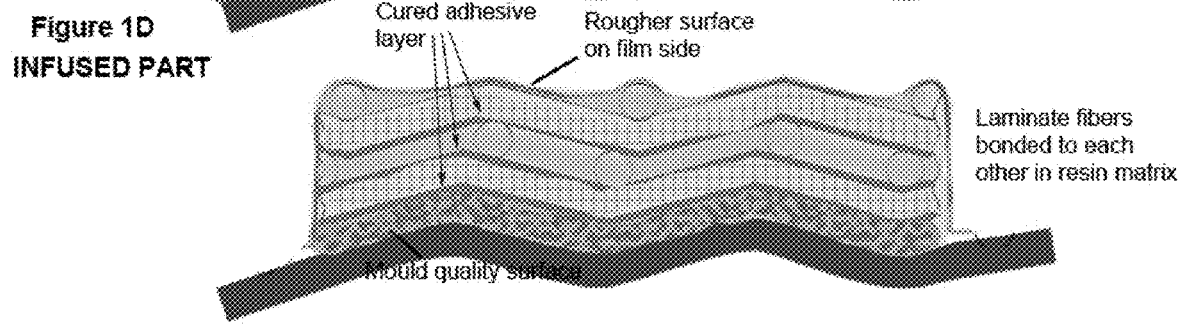

bisphenol-A,
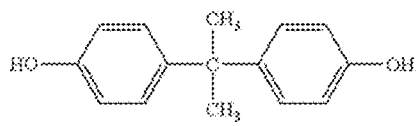
and epichlorhydrin,
are combined with sodium hydroxide, NaOH, to preferably form epichlorohydrin,
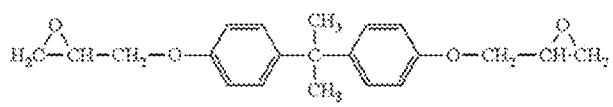 [SMILES: CC(C)(c1ccc(OCC2CO2)cc1)c1ccc(OCC2CO2)cc1]
Figure 2.

Short Beam Shear testing of carbon fiber preforms made using No adhesive; Acrylic Melamine adhesive; Melamine -BN adhesive

| preform type/Adhesive | specimen # | Thickness M | Width M | Length M | Failure Load N | TAU Critical Mpa | Ave Mpa | STD Dev |
|---|---|---|---|---|---|---|---|---|
| Carbon/No adhesive | 1A | 0.003685 | 0.007402 | 0.023768 | 1832 | 50.37 | | |
| Carbon/No adhesive | 2A | 0.003718 | 0.007431 | 0.023794 | 1772 | 48.10 | | |
| Carbon/No adhesive | 3A | 0.003652 | 0.007388 | 0.023777 | 1809 | 50.25 | | |
| Carbon/No adhesive | 4A | 0.003722 | 0.007398 | 0.023792 | 1764 | 48.05 | | |
| Carbon/No adhesive | 5A | 0.003732 | 0.007422 | 0.023765 | 1829 | 49.52 | | |
| Carbon/No adhesive | 6A | 0.003679 | 0.007409 | 0.023778 | 1844 | 50.74 | | |
| Carbon/No adhesive | 7A | 0.003711 | 0.007392 | 0.023784 | 1796 | 49.10 | | |
| Carbon/No adhesive | 8A | 0.003692 | 0.007425 | 0.023767 | 1789 | 48.95 | | |
| Carbon/No adhesive | 9A | 0.003705 | 0.007397 | 0.023792 | 1847 | 50.55 | | |
| Carbon/No adhesive | 10A | 0.003718 | 0.007385 | 0.023768 | 1819 | 49.69 | 49.53 | 0.972 |
| carbon/acrylic melamine-BN | 1B | 0.003678 | 0.007421 | 0.023779 | 1739 | 47.78 | | |
| carbon/acrylic melamine-BN | 2B | 0.003708 | 0.007411 | 0.023766 | 1719 | 46.92 | | |
| carbon/acrylic melamine-BN | 3B | 0.003699 | 0.007398 | 0.023788 | 1729 | 47.39 | | |
| carbon/acrylic melamine-BN | 4B | 0.003693 | 0.007402 | 0.023798 | 1698 | 46.59 | | |
| carbon/acrylic melamine-BN | 5B | 0.003722 | 0.007405 | 0.023769 | 1690 | 45.99 | | |
| carbon/acrylic melamine-BN | 6B | 0.003688 | 0.007398 | 0.023768 | 1723 | 47.36 | | |
| carbon/acrylic melamine-BN | 7B | 0.003733 | 0.007428 | 0.023788 | 1688 | 45.66 | | |
| carbon/acrylic melamine-BN | 8B | 0.003683 | 0.007405 | 0.023777 | 1692 | 46.53 | | |
| carbon/acrylic melamine-BN | 9B | 0.003725 | 0.007419 | 0.023799 | 1679 | 45.57 | | |
| carbon/acrylic melamine-BN | 10B | 0.003683 | 0.007395 | 0.023778 | 1703 | 46.90 | 46.67 | 0.752 |
| carbon/phenolic melamine-BN | 1C | 0.003666 | 0.007388 | 0.023769 | 1893 | 52.42 | | |
| carbon/phenolic melamine-BN | 2C | 0.003698 | 0.007395 | 0.023767 | 1877 | 51.48 | | |
| carbon/phenolic melamine-BN | 3C | 0.003722 | 0.007406 | 0.023778 | 1906 | 51.86 | | |
| carbon/phenolic melamine-BN | 4C | 0.003677 | 0.007422 | 0.023787 | 1916 | 52.66 | | |
| carbon/phenolic melamine-BN | 5C | 0.003728 | 0.007401 | 0.023769 | 1892 | 51.43 | | |
| carbon/phenolic melamine-BN | 6C | 0.003699 | 0.007383 | 0.023768 | 1920 | 52.87 | | |
| carbon/phenolic melamine-BN | 7C | 0.003731 | 0.007401 | 0.023788 | 1891 | 51.36 | | |
| carbon/phenolic melamine-BN | 8C | 0.003688 | 0.007425 | 0.023773 | 1905 | 52.18 | | |
| carbon/phenolic melamine-BN | 9C | 0.003708 | 0.007403 | 0.023789 | 1898 | 51.86 | | |
| carbon/phenolic melamine-BN | 10C | 0.003729 | 0.007392 | 0.023767 | 1914 | 52.08 | 52.02 | 0.521 |

Figure 3.

Curable Vacuum infusion composite manufacturing adhesive testing by short beam shear testing

| Type/Adhesive | specimen # | thickness m. | width m. | length m. | Failure load N | Tau Critical Mpa | Average Mpa | Standard Dev | |
|---|---|---|---|---|---|---|---|---|---|
| Glass/None | 1A | 0.004697 | 0.00896 | 0.026649 | 2984 | 53.18 | | | |
| Glass/None | 2A | 0.004553 | 0.008795 | 0.026504 | 2768 | 51.84 | | | |
| Glass/None | 3A | 0.00478 | 0.008665 | 0.026494 | 2452 | 43.4 | | | |
| Glass/None | 4A | 0.004521 | 0.008755 | 0.026546 | 2865 | 54.1 | | | |
| Glass/None | 5A | 0.004529 | 0.008665 | 0.026495 | 2789 | 52.1 | | | |
| Glass/None | 6A | 0.004555 | 0.00899 | 0.026553 | 2897 | 53.66 | | | |
| Glass/None | 7A | 0.004677 | 0.008695 | 0.026484 | 2679 | 48.79 | | | |
| Glass/None | 8A | 0.004775 | 0.008795 | 0.026498 | 2678 | 47.83 | | | |
| Glass/None | 9A | 0.004628 | 0.008855 | 0.026504 | 2954 | 54.24 | | | |
| Glass/None | 10A | 0.004533 | 0.008815 | 0.026522 | 2764 | 51.88 | 51.1 | 3.451 | <= Glass/No Adhesive |
| Glass/3M 77 | 1B | 0.00486 | 0.00878 | 0.026544 | 1326 | 23.03 | | | |
| Glass/3M 77 | 2B | 0.004728 | 0.00879 | 0.026493 | 1454 | 26.24 | | | |
| Glass/3M 77 | 3B | 0.004759 | 0.008809 | 0.026498 | 1365 | 24.42 | | | |
| Glass/3M 77 | 4B | 0.004672 | 0.008815 | 0.026504 | 1456 | 26.52 | | | |
| Glass/3M 77 | 5B | 0.004588 | 0.008795 | 0.026464 | 1522 | 26.29 | | | |
| Glass/3M 77 | 6B | 0.004597 | 0.00884 | 0.026488 | 1197 | 22.09 | | | |
| Glass/3M 77 | 7B | 0.004644 | 0.00883 | 0.026477 | 1177 | 21.53 | | | |
| Glass/3M 77 | 8B | 0.004647 | 0.008615 | 0.026465 | 1287 | 23.56 | | | |
| Glass/3M 77 | 9B | 0.004633 | 0.008845 | 0.026488 | 1456 | 26.65 | | | |
| Glass/3M 77 | 10B | 0.004544 | 0.008795 | 0.026525 | 1399 | 26.25 | 24.86 | 2.25 | <= Glass/3M 77 |
| Glass/phenolic melamine-BN | 1C | 0.004655 | 0.008775 | 0.026488 | 3022 | 55.49 | | | |
| Glass/phenolic melamine-BN | 2C | 0.004539 | 0.008795 | 0.026545 | 2987 | 56.12 | | | |
| Glass/phenolic melamine-BN | 3C | 0.004584 | 0.008755 | 0.026598 | 3095 | 57.84 | | | |
| Glass/phenolic melamine-BN | 4C | 0.004592 | 0.008765 | 0.026542 | 2985 | 55.62 | | | |
| Glass/phenolic Melamine-BN | 5C | 0.004591 | 0.008505 | 0.026499 | 2896 | 53.73 | | | |
| Glass/phenolic melamine-BN | 6C | 0.004566 | 0.008835 | 0.026552 | 3028 | 56.29 | | | |
| Glass/phenolic melamine-BN | 7C | 0.004621 | 0.00879 | 0.026497 | 2889 | 53.34 | | | |
| Glass/phenolic melamine-BN | 8C | 0.004676 | 0.008735 | 0.026527 | 3066 | 56.3 | | | |
| Glass/phenolic melamine-BN | 9C | 0.004583 | 0.008795 | 0.026488 | 2986 | 55.98 | | | |
| Glass/phenolic Melamine-BN | 10C | 0.004628 | 0.00885 | 0.026541 | 2894 | 52.98 | 55.33 | 1.527 | <= Glass/phenolic-melamine-BN |
| Glass/acrylic-melamine-BN | 1D | 0.004606 | 0.008757 | 0.026456 | 2891 | 53.57 | | | |
| Glass/acrylic-melamine-BN | 2D | 0.004786 | 0.008732 | 0.026455 | 2767 | 48.9 | | | |
| Glass/acrylic-melamine-BN | 3D | 0.004634 | 0.008811 | 0.026532 | 2989 | 54.9 | | | |
| Glass/acrylic-melamine-BN | 4D | 0.004645 | 0.008755 | 0.026445 | 2545 | 46.93 | | | |
| Glass/acrylic-melamine-BN | 5D | 0.004754 | 0.008759 | 0.026494 | 2776 | 49.94 | | | |
| Glass/acrylic-melamine-BN | 6D | 0.004599 | 0.008759 | 0.026564 | 2889 | 53.8 | | | |
| Glass/acrylic-melamine-BN | 7D | 0.004573 | 0.008694 | 0.026556 | 2811 | 51.24 | | | |
| Glass/acrylic-melamine-BN | 8D | 0.004742 | 0.008831 | 0.026497 | 2665 | 45.94 | | | |
| Glass/acrylic-melamine-BN | 9D | 0.004699 | 0.008844 | 0.026533 | 2499 | 45.11 | | | |
| Glass/acrylic-melamine-BN | 10D | 0.004797 | 0.008889 | 0.026479 | 2904 | 51.08 | 50.14 | 3.411 | <= Glass/acrylic-melamine-BN |

Figure 5.

CURABLE COMPOSITE MANUFACTURING ADHESIVE

CROSS-REFERENCE AND PRIORITY CLAIM TO RELATED APPLICATION

To the fullest extent permitted by law, the present U.S. Non-Provisional patent application claims priority to and the benefit of U.S. Provisional Patent Application entitled "Curable Composite Manufacturing Adhesive" filed on Sep. 23, 2013 and having Ser. No. 61/881,190, wherein the referenced application is incorporated by reference herein in its entirety.

FIELD

The present disclosure relates generally to adhesives, and more particularly, to an adhesive adapted to enable seamless polymerization during epoxy resin vacuum infusion techniques.

BACKGROUND

Vacuum infusion is a process wherein vacuum pressure is used to drive resin into a laminate structure. Typically, selected mats of random or woven fabric, such as fiberglass, carbon fiber, KEVLAR, foam core, or the like, are prepared and enclosed in a vacuum bag. Resin and catalyzer are then infused therein, typically after vacuum is drawn, and polymerization occurs after completion of an optimized curing period and at a selected temperature. The polymerization forms a rigid three-dimensional network structure defined by linear chains with cross-links there-between.

Positioning of laminate layers is essential to allow for a properly formed structure. Therefore, spray adhesive is sometimes applied to generally hold essentially dry layers in position prior to and during the vacuum infusion process, especially for sloped assemblies, such as large boat hulls. That is, an effective adhesive must be able to hold many layers of reinforcing fabric in a vertical aspect to satisfy the need. Unfortunately, many spray adhesives that are commonly utilized in such manner form a discernible interface, weakening the overall integrity of the cured structure, acting as a contaminant in the matrix. That is, premature failure of the cured structure may result at the area(s) of adhesive application, where resin structure is interrupted.

Resins such as polyester, vinyl ester, epoxy, acrylic or melamine or elastomer modification and blending of said resins may be utilized for vacuum infusion. Epoxy resins, however, have better relative mechanical properties and typically produce composite structures that are stronger and more heat tolerant, with a high strength/weight ratio. Epoxy, a structural or engineering adhesive well recognized for excellent adhesion properties and high heat and chemical resistance, finds application as a coating, adhesive and in composite materials, such as those using carbon fiber and fiberglass reinforcements, as discussed further herein. Epoxy is a copolymer comprising resin and hardener. Typically, monomers or short chain polymers with an epoxide group at one end define a resin. Hardener mixes with the resin and its amine groups, such as of the polyamine monomer triethylenetetramine, to form a covalent bond with the epoxide group of the resin. In such manner, a rigid structure is defined with crosslinking there-between, wherein the modified epoxy adheres to surfaces by forming strong polar bonds therewith.

A majority of epoxy resin is produced from epichlorohydrin and bisphenol-A, wherein bisphenol-A, or phenol-acetone, is formed from 2 mole phenol and 1 mole acetone. Epichlorohydrin is a mixture of propylene and chlorine, with free radical substitution at the double bond resulting in ally chloride as a main product, which may be further treated with layer separation and processing. Typically, for liquid epoxy resin, the bisphenol-A,

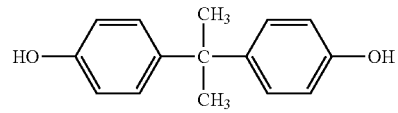

and epichlorhydrin,

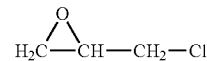

are combined with sodium hydroxide, NaOH, to preferably form epichlorohydrin,

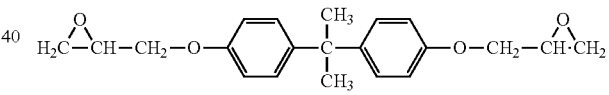

releasing Na+ and Cl−. The reaction thus removes unreacted phenol and acetone and attaches two glycidyl groups to the ends of the bisphenol-A to create a standard epoxy resin. The resulting epoxy prepolymer,

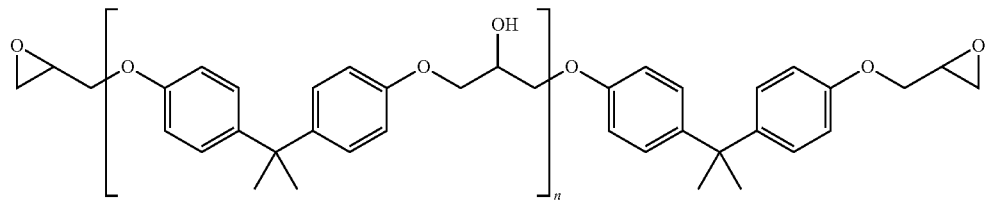

is reacted with amine compounds for cross-linking.

As noted, most spray adhesives typically utilized in the vacuum infusion process to hold laminates together generally influence and negatively influence the successful formation of strong polar bonds between the epoxy resin and the laminate surface(s). Interruption of the epoxy resin's cross-linking may also occur, further contributing to the weakened interface. That is, as noted, the typical adhesive interface is generally weaker than the rest of the structure, compromising the integrity of the materials formed.

A disadvantage of epoxy based vacuum infusion adhesives is that, Diglycidyl ether of bisphenol-A (DGEBA) epoxy resins belong to the most common causes of occupational allergic contact dermatitis. Additionally, DGEBA has caused occupational asthma. Eur J Dermatology. 2000 August;10(6):475-7. Allergy. 2002 December;57(12):1205-7. Acta Derm Venereol Suppl (Stockh). 1991;159:1-80.

Recognition that contact with liquid epoxy and vinyl ester resins, hardening agents and catalysts have a great potential to damage the personal health of workers led to the development of new and safer composite manufacturing practices. The foremost safety improvement was the composite vacuum bag infusion process. A foremost reason for its development was to give adequate protection to composite manufacturing workers by placing a sealed barrier (bag) between the curing article, thus avoiding resin contact with the worker skin, lungs and other airway surfaces.

Despite safety improvements in resin transfer methods. The same health disadvantages can be recognized through contact with an aerosolized epoxy adhesive. An essential step in vacuum bag infusion process is the material layering, which takes place prior to the bag covering steps. Epoxy spray adhesive has been developed to provide a curable spray adhesive holding the layers of material in a fixed state. However, because the adhesive is sprayed often with-out use of proper ventilation and other personal protection equipment, exposure and illness remains a concern. The adhesive of this patent has similar cross-linking functionality to earlier developed epoxy resin vacuum infusion enabling adhesives, but does not contain epoxy resins in its formulation. Instead, it contains a tackified melamine resin in combination with a phenolic or methacrylate resin.

In contrast to epoxy resins, methacrylic resins and methyolated melamine resins, and phenolic novolac and resol resins will seldom cause occupational allergic contact dermatitis or occupational asthma.

Numerous studies indicate that methacrylic resins are unlikely to be a respiratory sensitizer. Crit Rev Toxicol. 2011 March;41(3):230-68. doi:
10.3109/10408444.2010.532768.
Methyl methacrylate and respiratory sensitization: a critical review.
Borak J, Fields C, Andrews L S, Pemberton M A.
Source
Department of Epidemiology and Public Health, Yale University, New Haven, Conn. 06510, USA. jonathan.borak@yale.edu Therefore, it is readily apparent that there is need for a vacuum infusion adhesive that does not contain epoxy resin DGEBA, that allows for secure placement of laminates, and that polymerizes with the epoxy resin within vacuum bag processes, thereby creating a seamless cured structure and thereby avoiding the above-discussed health disadvantages.

Previous studies have identified by Xinghong Zhang et al. that beneficial thermoset properties result from a tri-hybridization of DGEBA epoxy, phenol formaldehyde novolac resin (n-PF), and hexa(methoxymethyl)melamine. These studies indicate that hexa(methoxymethyl)melamine (HMMM) will self-condensate and condensate with phenol formaldehyde novolac resin (n-PF), and then when combined in an addition reaction with DEBGA epoxy will form a homogeneous, transparent hybrid thermoset.

"Based on the self-condensation of (HMMM), the condensation between HMMM and phenol formaldehyde novolac resin (n-PF), and the addition reaction of diglycidyl ether of biphenyl A (DGEBA) and n-PF, a homogeneous, transparent hybrid thermoset was prepared via in situ polymerization of DGEBA, n-PF, and HMMM. No phase separations were observed even for the DGEBA/n-PF/HMMM hybrid thermoset containing 40 wt % HMMM. These hybrid thermosets had high glass-transition temperatures (98-127° C. from differential scanning calorimetry and 111-138° C. from dynamic mechanical analysis), excellent thermal stability with high 5 wt % decomposition temperatures (>322° C.), high char yields (>24 wt %), and improved flame retardantcy with high limited oxygen indices (>28.5)."
Reference: Preparation and properties of epoxy/phenol formaldehyde novolac/hexakis(methoxymethyl)melamine hybrid resins from in situ polymerization
1. Xinghong Zhang,
2. Boxuan Zhou,
3. Xueke Sun,
4. Guorong Qi*
Journal of Applied Polymer Science Volume 110, Issue 6, pages 4084-4092, 15 Dec. 2008.

Based on these previous studies by Xinghong Zhang et al., the use of HMMM resin in combination with a phenolic novolac resin were considered logical starting point materials in this invention.

SUMMARY

Briefly described, in a preferred embodiment, the presently disclosed adhesive and methods related thereto overcome the above-mentioned health exposure disadvantages and while meeting the recognized need by enabling seamless polymerization during resin vacuum infusion techniques and by avoiding creation of any weakened adhesive interface and the development occupational allergic contact dermatitis and occupational asthma due to personal exposure during its application.

According to its major aspects and broadly stated, in its preferred form, the present embodiments feature 2 vacuum infusion adhesives that may be utilized to hold laminate layers together in a vertical aspect as resin is driven into a laminate structure. The adhesives include properties that cross-link with said liquid resins present in the curing laminate structure. Generally, laminate layers are assembled, reinforced with carbon fiber or the like, wherein these dry materials are held together on structural or mold surfaces, curing with the resin, resulting in a single, structurally uninterrupted formation. Unlike other known adhesives, the presently described adhesives, preferably delivered as a spray, do not interfere with the curing process of the said resins, but in fact cross link and harden along with the said resins to form a single integrated structure therewith, delivering unexpectedly improved shear strength in both fiberglass and carbon fiber applications.

More specifically, the preferred adhesive of the present disclosure features an adduct of Hexa(methoxymethyl) melamine and carboxyl terminated butadiene nitrile rubber modified with tackifiers and catalysts to form an adhesive, wherein preparation as an aerosol spray allows for application to fiberglass or carbon fiber cloth, for example, and wherein the adhesive formula facilitates use in the vacuum infusion process.

In general, one aspect of another embodiment features an adhesive composition comprising a solvent borne methacrylic resin and a Hexa(methoxymethyl) melamine resin coupled with suitable tackifiers to effectively hold the layers of reinforcement together after the carrier solvent evaporates, and until the matrix can be placed under vacuum and infused.

In one implementation, the disclosed compositions are sprayed as an adhesive on substrates such as fiberglass or carbon fiber fabrics, then the layers to be sealed are placed into a vacuum bag and epoxy resin plus hardener is infused under vacuum.

In another implementation, the functionality of the phenolic resin and Hexa(methoxymethyl) melamine resin in the adhesive makes it compatible with the infusing of said resins and hardener, so that the adhesive polymerizes with the said resins to prevent flaws in the cured composite polymer structure.

In another implementation, the composition of the present disclosure comprises Hexamethoxymethyl melamine resin which is non-self-condensing highly methylated and has an equivalent weight (based on reactive hydrogens) of 130-180 and serves as a good crosslinking agent for hydroxyl, carboxyl and amide groups as alkyds, polyesters, acrylic, epoxy, urethane and cellulosics with catalyst.

In another implementation, the composition of the present disclosure comprises a methylated high imino melamine resin which is partially methylolated and highly alkylated with an equivalent weight (based on reactive hydrogens) of 180-240.

In another implementation, the composition of the present disclosure comprises a methylated melamine resin, which is partially alkylated and highly methylolated with an equivalent weight (based on reactive hydrogens) of 180-240.

In another implementation, the composition of the present disclosure comprises a mixed ether melamine resin which is highly alkylated with an equivalent weight (based on reactive hydrogens) of 140-200.

In another implementation, the composition of the present disclosure comprises a mixed ether melamine resin that is highly alkylated with combinations of methoxy sites and longer chain length ethoxy, n-butoxy or iso-butoxy sites, having an equivalent weight (based on reactive hydrogens) of 140-200.

In another implementation, the composition of the present disclosure comprises a partially n-butylated and partially methylolated melamine resin with an equivalent weight (based on reactive hydrogens) of 220-280.

In another implementation, the composition of the present disclosure comprises a highly n-butylated melamine resin with an equivalent weight (based on reactive hydrogens) of 160-220.

In another implementation, the composition of the present disclosure comprises an n-butylated high imino melamine resin with an equivalent weight (based on reactive hydrogens) of 180-220.

In another implementation, the composition of the present disclosure comprises a iso-butylated melamine resin with an equivalent weight (based on reactive hydrogens) of 160-220

In another implementation, the carrier solvent is acetone, whereby exemption from volatile organic compound (VOC) regulation is realized, and wherein evaporation is quick.

In another implementation, the adhesive dissolves in the infusing epoxy resin.

In another implementation, the adhesive of the present disclosure is utilized for vacuum infusion of epoxy fiberglass.

In another implementation, the adhesive of the present disclosure is utilized for vacuum infusion of acrylic fiberglass.

In another implementation, the composition of the present disclosure comprises carbon fiber infusion and acrylic polymer in acetone, wherein carboxyl terminated butadiene nitrile rubber adducted with hexamethoxymethyl melamine resin, tackifiers, hardeners and catalysts are incorporated to provide for a tacky and/or sticky nature for the composition following evaporation of the acetone.

In another implementation, the composition of the present disclosure comprises carbon fiber infusion and phenolic resin in acetone, wherein carboxyl terminated butadiene nitrile rubber adducted with hexamethoxymethyl melamine resin, tackifiers, hardeners and catalysts are incorporated to provide for a tacky and/or sticky nature for the composition following evaporation of the acetone.

In another implementation, the adhesive cross links with vacuum infusion epoxy resin.

In another implementation, one or more tackifiers, adducts, and/or hardeners are added to enhance adhesive properties of acrylic resin dissolved in acetone.

In another implementation, adducts may be added to the adhesive formula to further influence acrylic resin reactants therewith.

In another implementation, selectively compatible tackifiers may be introduced to influence tack of the acrylic adhesive.

In one implementation, the composition is a mixture of melamine resin and acrylic resin polymer.

In another implementation, a selectively increased volume of acetone is added to the composition carrier solvent volume of acetone to reduce viscosity and thin out the adhesive, for enhanced spray can delivery of the adhesive.

In another implementation, a fumed silica filler may be introduced to help maintain a uniform spray and/or to promote improved short beam shear strength. In another aspect, the present disclosure features a laminate structure, including a core layer having a first surface and a second surface, a cross-linking adhesive applied on at least one of the surfaces, and a reinforcing layer, such as fiberglass or carbon fiber, in contact with the at least one surface adapted with adhesive, wherein the resulting laminate structure is a cohesive resin cured unit.

In one implementation, the infusion process resin is bisphenol A/epichlorohydrin epoxy resin and the adhesive is acrylic resin with added melamine-formaldehyde resin.

In another implementation, the infusion process is bisphenol A/epichlorohydrin epoxy resin and the adhesive is phenolic heat reactive novolac resin with added melamine resin with added adduct of melamine and carboxyl terminated butadiene nitrile rubber.

In another implementation, the infusion process is bisphenol A/epichlorohydrin epoxy resin and the adhesive is phenolic heat reactive resol resin with added melamine resin with added adduct of melamine and carboxyl terminated butadiene nitrile rubber.

In another implementation, the infusion process is bisphenol A/epichlorohydrin epoxy resin and the adhesive is phenolic non-heat reactive novolac resin with added melamine resin with added adduct of melamine and carboxyl terminated butadiene nitrile rubber.

In another implementation, the infusion process is bisphenol A/epichlorohydrin epoxy resin and the adhesive is phenolic heat reactive novolac resin with added melamine resin with added adduct of melamine and carboxyl terminated butadiene nitrile rubber.

In another implementation, the infusion process is bisphenol A/epichlorohydrin epoxy resin and the adhesive is phenolic heat reactive resol resin with added melamine resin with added adduct of melamine and carboxyl terminated butadiene nitrile rubber.

In another implementation, the infusion process is bisphenol A/epichlorohydrin epoxy resin and the adhesive is a polyamine resin with added melamine resin with added adduct of melamine and carboxyl terminated butadiene nitrile rubber.

In another implementation, one-half the amount of hexamethoxymethyl melamine is replaced by butylated melamine-formaldehyde resin in the formulation, and the difference made up with isobutyl methyl methacrylate, allowing for improved hardness, better chemical resistance, and better stability.

One feature and advantage of the adhesives of the present disclosure is their ability to form a superior interface between laminate layers, wherein the interface is essentially incorporated into the formed epoxy-cured structure because the adhesive base is premised upon hexa(methoxymethyl) melamine resin and phenolic resin, which cross-links well with the epoxy infusion process resin.

Another feature and advantage of the adhesive of the present disclosure and methods related thereto is not only the achievement of increased strength of vacuum infusion results over alternatives, with maximum tensile shear strength, but also that the adhesive remains low VOC (volatile organic components) and HAP's free (no components from EPA's hazardous air pollutants list).

Another feature and advantage of the adhesive of the present disclosure is that the adhesive begins as an independent component introduced into the vacuum infusion process for the purpose of holding the layers together until sealed within the vacuum bag, but the adhesive completes the process as a matrix member that is cross-linked with an epoxy resin.

Still another feature and advantage of the adhesive of the present disclosure is that the adhesive safely fuses laminating materials to structural core surfaces, providing superior holding prior to sealing in the vacuum bag, and further dissolves and becomes a structural component curing with the epoxy resins thereafter.

Still another feature and advantage of the adhesive of the present disclosure is that use of the adhesive is not as prone to causing occupational allergic contact dermatitis and occupational asthma as adhesives containing Diglycidyl ether of bisphenol A (DGEBA) epoxy resin.

These and other features, capabilities and advantages will become more apparent to one skilled in the art from the following description and claims when read in light of the accompanying drawings.

BRIEF DESCRIPTION OF THE DRAWINGS

The present disclosure will be better understood by reading the Detailed Description of the Preferred and Alternate Embodiments with reference to the accompanying drawing figures, in which like reference numerals denote similar structure and refer to like elements throughout, and in which:

FIG. 1A through 1D illustrates typical layers preform assembly and stages of resin infusion implemented in a typical embodiment of the process;

FIG. 2 illustrates an embodiment of typical epoxy resin cross-linking reactions;

FIG. 3 illustrates a first tabular presentation of initial adhesive formula performance testing with carbon fiber;

FIG. 5 illustrates a second tabular presentation of further adhesive formula performance testing with fiberglass.

DETAILED DESCRIPTION

In describing the preferred and alternate embodiments of the present disclosure, as illustrated in the FIGS. 1-6 and/or described herein, specific terminology is employed for the sake of clarity. The disclosure, however, is not intended to be limited to the specific terminology so selected, and it is to be understood that each specific element includes all technical equivalents that operate in a similar manner to accomplish similar functions.

Manufacturers of epoxy-fiberglass or epoxy-carbon fiber structures using the vacuum infusion process need an adhesive product to hold fabrics together until infusion and curing is complete. Manufacturers of epoxy-fiberglass or epoxy-carbon fiber structures using the vacuum infusion process also need an adhesive product that does not act as a contaminant in the resin matrix. Manufacturers of epoxy-fiberglass or epoxy-carbon fiber structures using the vacuum infusion process also need an adhesive that is not composed of epoxy resins that cause skin sensitization, occupational allergic contact dermatitis and occupational asthma. Having previously successfully developed, an adhesive comprising of epoxy Diglycidyl ether of bisphenol A (DGEBA) epoxy resin, an adduct of carboxylic acid terminated butadiene nitrile rubber and Diglycidyl ether of bisphenol A epoxy resin and acetone, as described in U.S. Pat. No. 20120299216 A1, a new investigation was undertaken to develop an improved adhesive for use in multiple type liquid resin vacuum infusion and light resin transfer systems that would allow reduced exposure to the hazardous components of the adhesive described in U.S. Pat. No. 20120299216 A1. A complex series of trial and error experiments was conducted to conceive, analyze, identify, and create a new combination of materials that, when formulated together, would deliver heretofore unavailable results relative to vacuum infusion epoxy laminates, and according to an entirely original perspective relative to the previous epoxy resin adhesive. The result, after many modifications directed to improve particular characteristics, including stickiness, spray characteristics and product shelf-life, was a discovery of 2 final adhesive formulations composed of ingredients that are compatible with epoxy vacuum infusion resins and would allow for efficient spray application for preparation of vacuum infusion epoxy laminates, that would be able to hold many layers of reinforcing fabric in a vertical aspect, and that would integrate into the cured epoxy laminate structure rather than form a potentially weakening interface, that exposure to would not cause skin sensitization, occupational allergic contact dermatitis and occupational asthma, all with low VOC emissions.

Figure 4:
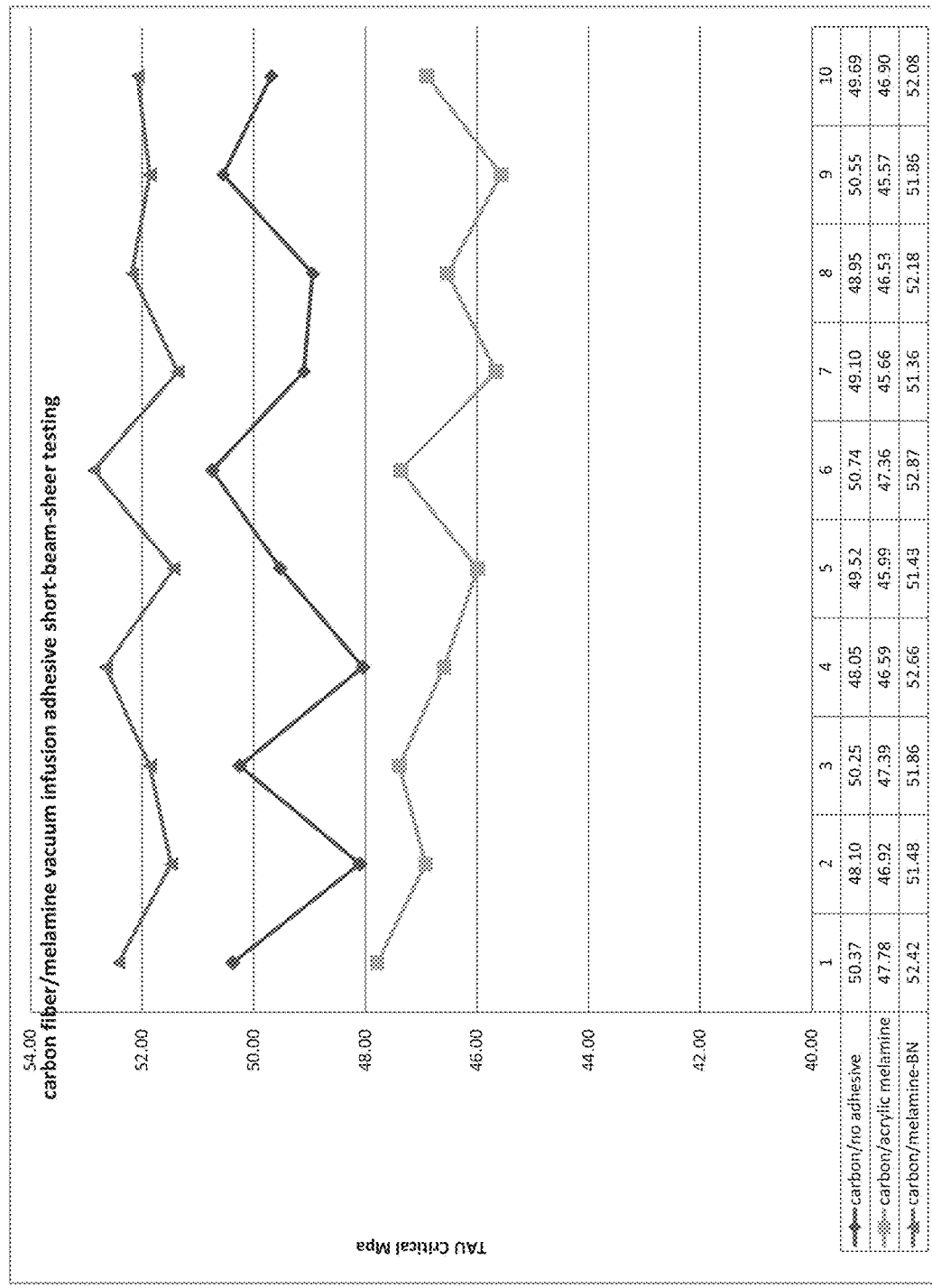
FIG. 4 illustrates a first graphical presentation of initial adhesive formula performance testing with carbon fiber.
Figure 6:
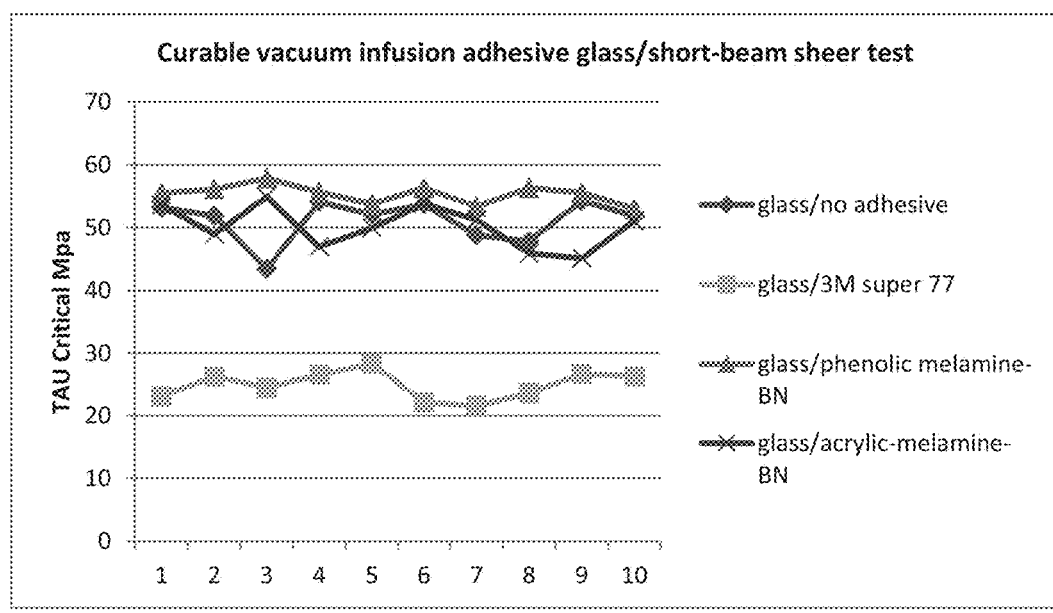
FIG. 6 illustrates a second graphical presentation of further adhesive formula performance testing with fiberglass.

In reference now to FIGS. 3 and 4, an adhesive formula was discovered with strength recovery of over 105% in preliminary testing. This strength recovery estimate was estimated during short beam shear testing by dividing the average measured strength of ten samples of an epoxy cured carbon fiber laminate structure with adhesive 10 applied by the average measured strength of ten samples of an epoxy cured carbon fiber laminate structure without adhesive 10 (as shown, 52.02 mPA/49.53 mPA=1.05). Those skilled in the art recognize results above 105% are very good for such short beam shear testing comparisons, and further testing, discussed herein below, further confirmed the unexpectedly zero impact of adhesive 10 on the epoxy cured laminate structure.

In reference now to FIGS. 1A through 1D, vacuum infusion laminate adhesive 10 holds laminate layers together as epoxy resin is driven into a laminate structure. Adhesive 10 comprises properties that cross-link with epoxy resin as it cures. Generally, the laminate layers include the assembly of epoxy resin reinforced with fiberglass and/or carbon fiber. Present infusion molding used to fabricate epoxy resin structures is improved with the use of adhesive 10 and the methods related thereto described herein.

The presently described technique encapsulates carbon fiber and/or fiberglass with multiple type resins while the resin cures, resulting in superior structural strength while allowing for low VOC emissions. The presently described process enables the use of adhesive 10 to hold components in place in a vertical aspect while the laminate is bagged and subsequently infused with epoxy resin under vacuum. Cross linkable adhesive 10 enables the creation of strong connections between laminate layers, wherein adhesive 10 preferably cures with epoxy resin and becomes an integral part of the cured structure, as discussed further herein. During curing, low shrinkage is observed. In addition, maximum tensile shear strength may be obtained.

In a typical embodiment, adhesive 10 is enclosed within a spray can and is applied to hold dry materials together and onto structural surfaces, ultimately curing with the epoxy resin to result in a single, uninterrupted structural formation. The polymeric mixture, Melamine CTBN adduct resin and phenolic resin spray of adhesive 10 does not interfere with or contaminate the curing process of epoxy resins, wherein adhesive 10 instead cross links and/or otherwise structurally integrates and hardens along with the epoxy resin to form an integrated chemical structure.

It should be understood that adhesive 10 may be enclosed in a canister or other suitable container, or otherwise applied in a manner desirable relative to the work-piece.

Adhesive 10 is preferably comprised of a formulated hexamethoxymethyl melamine CTBN adduct resin base, preferably modified with phenolic resin tackifiers. The unique compatibility of the base of adhesive 10 with the epoxy resin of the target vacuum infusion procedure facilitates delivery of superior infusion results. However, it is the further modifications to that base that provide for the preferred tacky nature of adhesive 10 after the carrier solvent, preferably acetone, has evaporated. That is, in a typical implementation, adhesive 10 is prepared by dissolving hexamethoxymethyl melamine CTBN adduct resin and one or more tackifiers in a solvent, preferably acetone. Acetone is quick to evaporate, is exempt from VOC regulation, and is therefore preferred as a carrier solvent. However, it should be recognized by one skilled in the art that other carrier solvents could be utilized.

According to the preferred embodiment, adhesive 10 is a mixture of a phenolic and a melamine resin, which has a carboxyl terminated butadiene nitrile (CTBN) adduct. Although a different combination or a single resin may alternately be utilized, the preferred mixture delivers improved toughness, elasticity, and tack of the hexamethoxymethyl melamine CTBN adduct portion of adhesive 10. Additionally, tackifier selection preferably optimizes stickiness or tack of adhesive 10, wherein tackifiers in the form of phenolic, novolac or resol or ployamide resins are preferred, but other commonly known tackifiers may perform suitably.

When the composition is to be delivered by a spray can, as preferred, adhesive 10 is formulated with a lower viscosity to enable pressurized placement with gas for satisfactory adhesive spray, wherein viscosity is preferably influenced and balanced in the formula of adhesive 10 with the addition of more acetone carrier. In the preferred embodiment, especially for spray delivery, the fumed silica filler AEROSIL is added, resulting in maintenance of a uniform spray and promotion of improved short beam shear strength.

In another embodiment, when the composition is packaged in a canister, a small amount of propane-isobutane, or other gas and/or hydrocarbon is used and pressurized with nitrogen or other suitable gas to a higher pressure. In such an embodiment, a higher viscosity may be utilized, thereby accommodating a higher solids level in the basic composition. That is, the higher the concentration in terms of weight percent solids to the total weight of the mix, the higher the viscosity, wherein canisters can generally withstand higher pressure than cans.

In use, laminates, or composites, are preferably prepared from layers of carbon fiber material held together with adhesive 10. These composites are vacuum infused with epoxy resin. Samples prepared according to such process and with adhesive 10, after curing, were subjected to testing using ASTM D 2334, "Standard Test Method for Short-Beam Strength of Polymer Matrix Composite Materials and Their Laminates," to determine the "short-beam strength of the high-modulus fiber-reinforced composite materials", wherein no weak spots were detected in the compositions formed using adhesive 10. That is, the interlaminar shear strength was determined by comparative flexing of composite specimens by delivery of controlled forces thereto until breakage occurred, and confirmation of the structural integration of adhesive 10 into the cured laminate structure was realized.

Exemplary Test Data

In order to test the efficacy of hexamethoxymethyl melamine—CTBN adduct adhesive 10, laminate samples were prepared and analyzed following a procedure similar to ASTM D 2334. Fiberglass laminate layers were prepared: first, with no adhesive, second, with representative multi-purpose aerosol adhesive, 3M SUPER 77, and third, with melamine adhesive 10 with phenolic resin tackifier, and fourth, melamine adhesive 10 with acrylic resin tackifier. Ten samples were tested for each variation. Maximum shear stress (MPa) repeatedly confirmed the unexpected benefits of epoxy adhesive 10, as compared to the representative traditional, multi-purpose adhesive. Sample data and measured results are presented in FIG. 5, with graphical representation in FIG. 6. Both the phenolic and the acrylic tackified versions of adhesive 10 demonstrated strength recoveries double that of traditional adhesive. The acrylic tackified version of adhesive 10 demonstrated 97.9% strength recovery, while the performance of phenolic tackified adhesive 10 demonstrated 108% strength recovery. An 8% higher than no-adhesive, is an unexpectedly synergistic improvement for use in epoxy laminate applications. The traditional adhesive demonstrated a strength recovery of only 48.6%.

In the procedure, laminates and fiberglass were thus either sprayed with adhesive 10 with phenolic resin tackifier, or sprayed with adhesive 10 with acrylic resin tackifier, or sprayed with representative traditional adhesive, or placed together with no adhesive. The assembled laminates were placed into a vacuum bag, and epoxy resin and hardeners were appropriately introduced. Vacuum remained until resin curing was complete. The completed samples, of dimensional specifications as noted in FIG. 5, were subjected to short beam shear testing, with failure load recorded for each sample, also as displayed in FIG. 5. The performance of phenolic tackified adhesive 10 relative to the control epoxy laminate structure without adhesive was remarkable, and the magnitude of improvement of shear strength with both phenolic tackified and acrylic resin tackified adhesive 10 as compared to traditional adhesive was unexpected. The testing results indicate that adhesive 10 with phenolic tackifier may be utilized in epoxy laminate applications to improve the resulting laminate structure.

Having thus described exemplary embodiments of the present apparatus and method, it should be noted by those skilled in the art that the within disclosures are exemplary only, and that various other alternatives, adaptations, and modifications may be made within the scope of the present disclosure. Accordingly, the present disclosure is not limited to the specific embodiments illustrated herein, but is limited only by the following claims.

The invention claimed is:

1. A cross-linking adhesive composition comprising:
   Melamine resin; and tackifier, wherein said adhesive composition is dissolved in an organic ketone; and one or more adducts; wherein said melamine resin has a carboxyl terminated butadiene nitrile adduct.

2. The adhesive composition of claim 1, wherein said melamine resin is hexa(methoxymethyl) melamine.

3. The adhesive composition of claim 1, wherein said organic ketone is acetone.

4. The adhesive composition of claim 1, wherein said tackifier is selected from a group of phenolic, novolac or resol resins or is isobutyl methacrylate.

5. The adhesive composition of claim 1, further comprising fumed silica filler.

* * * * *